July 13, 1965 D. G. ROEDEL 3,193,963
ARTIFICIAL FISHING LURES
Filed June 20, 1963

INVENTOR.
Donald G. Roedel.
BY
Fearman Fearman & McCulloch
ATTORNEYS 8,193,963
ARTIFICIAL FISHING LURES
Donald G. Roedel, 303 S. Barclay St., Bay City, Mich.
Filed June 20, 1963, Ser. No. 289,293
1 Claim. (Cl. 43—42.39)

This invention relates to artificial lures, and is more particularly related to lures of the type simulating the appearance of small fish equipped with a hook or hooks for catching larger fish which are attracted by the appearance and the movement of the lure.

One of the prime objects of the invention is to design an artificial lure of simple and inexpensive construction which, when jigged in the water by means of a fish line, or actuated by water currents, will simulate the actions of small fish darting in various directions while maintaining a substantially even keel at a depth which depends on the size and weight of the lure and the adjustment of auxiliary weights which may be employed with it.

Another object of the invention is to design an artificial lure which can be manufactured and constructed of lightweight sheet metal so that the various parts can be formed by punching them out of sheet metal, plastic, or other material and which may also be molded if desired.

A further object is to provide an artificial lure which can be readily manufactured and assembled and from materials which can be easily punched to provide mass production with the savings in manufacturing cost incident thereto.

Still a further object is to provide an artificial lure comprising a relatively flat, curved body, and a plurality of wings associated therewith with a minimum of labor for stabilizing the movements of the lure in the water.

With the above and other objects in view, the present invention consists in the combination and arrangement of parts, hereinafter more fully described, illustrated in the accompanying drawing, and more particularly pointed out in the appended claim; it being understood that changes may be made in the form, size, proportion and minor details of construction, without departing from the spirit, or sacrificing any of the advantages of the invention.

Figure 2:
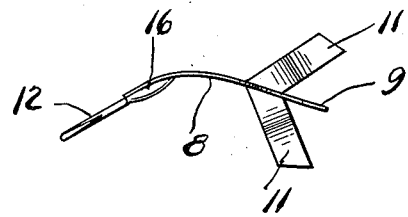
FIG. 2 is a top plan view thereof.
Figure 5:
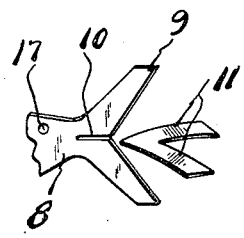
FIG. 5 is a side elevational view of the lure, the horizontal wings being shown in position for mounting on the body.
Figure 1:
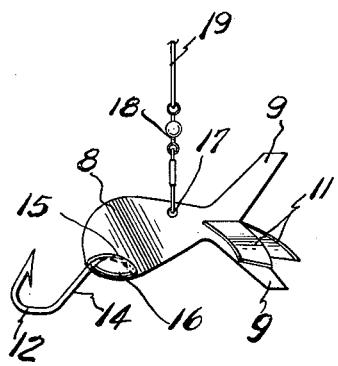
FIG. 1 is a side elevational view of my new lure.
Figure 4:
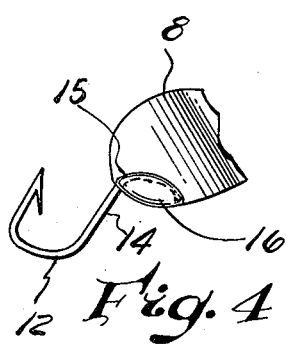
FIG. 4 is an enlarged view illustrating the weight balancing feature.
Figure 3:
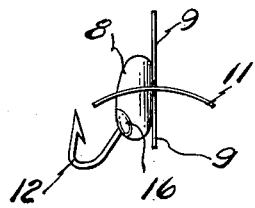
FIG. 3 is an end elevational view.

Referring now more specifically to the drawing in which I have shown the preferred embodiment of my invention.

The body 8 of the lure herein shown is a stamping shaped to simulate a small fish, the body being longitudinally curved as shown, the one end terminating in a pair of angularly disposed, diverging wings 9 similar to the tail of the fish, the body 8 being split as at 10 to accommodate a similar pair of angularly disposed diverging wings 11, the front end of which is inserted in the split 10 where it is welded, soldered, or otherwise secured in position to stabilize the lure, and these have a slight downward pitch so that the lure describes a circular path when jigged. A conventional fishhook 12 is mounted on the lure body 8 in the position as shown, the shank 14 being bent as at 15, and a gob of solder or other metal 16 of proper weight is applied to balance the lure and insure its horizontal position when in the water or being pulled through the water.

A small opening 17 is provided in predetermined location in the body 8 and accommodates swivel 18 connected to a leader 19 which is in turn connected to a conventional fish line (not shown).

In practice, a worm or other bait (not shown) is mounted on the hook 12 which projects forwardly beyond the front end of the body, and when this is connected to a fish line and lowered into the water, it remains in substantially horizontal position regardless of water currents or jigging action by the fisherman. Since the lure is in substantially horizontal position, the fish is more apt to take the bait lengthwise of the lure, and is therefore more certain to be hooked. The attached drawing illustrates one form of the invention, but it will be understood that the same is capable of certain modifications as to colors, materials, and deatils of construction and arrangement and combination of parts within the scope of the invention herein disclosed.

What I claim is:

An artificial lure comprising; a body formed of a relatively thin longitudinally bowed stamping, the rear end of which terminates in a pair of vertical angularly disposed, diverging wing sections simulating a fish tail; a second pair of wing sections secured to and disposed horizontally on said body equidistant between said vertical wings; a fishhook secured to and projecting forwardly beyond the front end of the bowed body; means intermediate the ends of the body for attaching a fishline; and a weight on the front end of said stamping to both secure said hook and balance said lure on said line in edgewise horizontal position in the water.

References Cited by the Examiner

UNITED STATES PATENTS

| 1,681,316 | 8/28 | Waters | 43—42.5 |
| 1,789,630 | 1/31 | Knight | 43—42.39 X |
| 1,950,075 | 3/34 | Akerson | 43—42.49 X |
| 2,561,515 | 7/51 | Keeler | 43—42.39 X |
| 2,795,076 | 6/57 | Luft | 43—42.49 X |

SAMUEL KOREN, *Primary Examiner.*

ABRAHAM G. STONE, *Examiner.*